United States Patent
Ghosh et al.

(10) Patent No.: US 11,869,487 B1
(45) Date of Patent: *Jan. 9, 2024

(54) ALLOCATION OF LOCAL AND REMOTE RESOURCES FOR SPEECH PROCESSING

(71) Applicant: Amazon Technologies, Inc., Seattle, WA (US)

(72) Inventors: Sanjoy Ghosh, Sunnyvale, CA (US); Pieter Sierd van der Meulen, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 473 days.

This patent is subject to a terminal disclaimer.

(21) Appl. No.: 16/543,094

(22) Filed: Aug. 16, 2019

Related U.S. Application Data

(63) Continuation of application No. 14/750,151, filed on Jun. 25, 2015, now Pat. No. 10,388,277.

(51) Int. Cl.
*G10L 15/18* (2013.01)

(52) U.S. Cl.
CPC .................... *G10L 15/18* (2013.01)

(58) Field of Classification Search
CPC ......... G10L 15/30; G10L 15/22; G10L 15/18; G10L 2015/223; G10L 15/1822; G10L 21/06; G10L 25/54; H04L 12/282
See application file for complete search history.

(56) References Cited

U.S. PATENT DOCUMENTS

| 6,185,535 B1* | 2/2001 | Hedin | G10L 15/30 704/E15.047 |
| 6,408,272 B1* | 6/2002 | White | G10L 15/30 704/E15.047 |
| 10,388,277 B1* | 8/2019 | Ghosh | G10L 15/22 |
| 2011/0108019 A1 | 5/2011 | Minick et al. | |
| 2012/0179464 A1* | 7/2012 | Newman | G10L 15/32 704/E15.001 |
| 2013/0194278 A1 | 8/2013 | Zajac, III | |

(Continued)

FOREIGN PATENT DOCUMENTS

EP   2699015 A2   2/2014

OTHER PUBLICATIONS

Office Action for U.S. Appl. No. 14/750,15, dated Oct. 19, 2107, Ghosh, "Allocation of Local and Remote Resources for Speech Processing", 14 pages.

(Continued)

*Primary Examiner* — Angela A Armstrong
(74) *Attorney, Agent, or Firm* — Lee & Hayes, P.C.

(57) ABSTRACT

Speech processing tasks may be allocated at least partly to a local device (e.g., user computing device that receives spoken words) and at least partly to a remote device to determine one or more user commands or tasks to be performed by the local device. The remote device may be used to process speech that the local device could not process or understand, or for other reasons, such as for error checking. The local device may then execute or begin to execute locally determined tasks to reduce user-perceived latency. Meanwhile, the entire media input, or a portion thereof, may be sent to the remote device to process speech, verify the tasks and/or identify other user commands in the media input (or portion thereof).

20 Claims, 8 Drawing Sheets

(56) References Cited

U.S. PATENT DOCUMENTS

| | | |
|---|---|---|
| 2013/0290876 A1 | 10/2013 | Anderson et al. |
| 2014/0108019 A1* | 4/2014 | Ehsani .................. G10L 21/06 704/275 |
| 2014/0289362 A1 | 9/2014 | Itoh et al. |
| 2015/0120296 A1 | 4/2015 | Stern et al. |

OTHER PUBLICATIONS

Final Office Action dated Nov. 29, 2018 for U.S. Appl. No. 14/750,151 "Allocation of Local and Remote Resources for Speech Processing" Ghosh, 17 pages.

Office action for U.S. Appl. No. 14/745,228, dated Mar. 31, 2017, Dixit, "Multi-Device User Interface", 11 pages.

Office action for U.S. Appl. No. 14/750,151, dated Apr. 13, 2017. Ghosh, "Allocation of Local and Remote Resources for Speech Processing", 13 pages.

Office action for U.S. Appl. No. 14/750,151, dated Apr. 5, 2017. Ghosh, "Allocation of Local and Remote Resources for Speech Processing", 13 pages.

\* cited by examiner

ALLOCATION OF LOCAL AND REMOTE RESOURCES FOR SPEECH PROCESSING

CROSS REFERENCE TO RELATED APPLICATIONS

This disclosure is a continuation of and claims priority to U.S. patent application Ser. No. 14/750,151, filed Jun. 25, 2015, which is incorporated herein by reference.

BACKGROUND

Computing devices have become commonplace in almost every environment. Some devices maintain connectivity to the Internet or some other network to provide information to a user of the device at a moment's notice. Increasingly, the user's request for information from these devices is in the form of a verbal or audible command. These commands are processed to recognize and convert the commands into machine executable instructions.

Despite many advancements that make automated speech recognition possible, commands tend to be distributed entirely to the device, thereby reducing the breadth of recognizable commands; or processed entirely remotely requiring constant connectivity of the device. For example, a system that processes all speech locally may be limited to a discrete set of recognizable words or commands and/or may be limited by the storage and processing capabilities of the device. Systems that rely on remote processing of speech may recognize a greater number of commands with greater accuracy and less training; however, these systems cannot function without a connection to the remote network and often experience latency that is greater than latency associated with locally processed speech.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
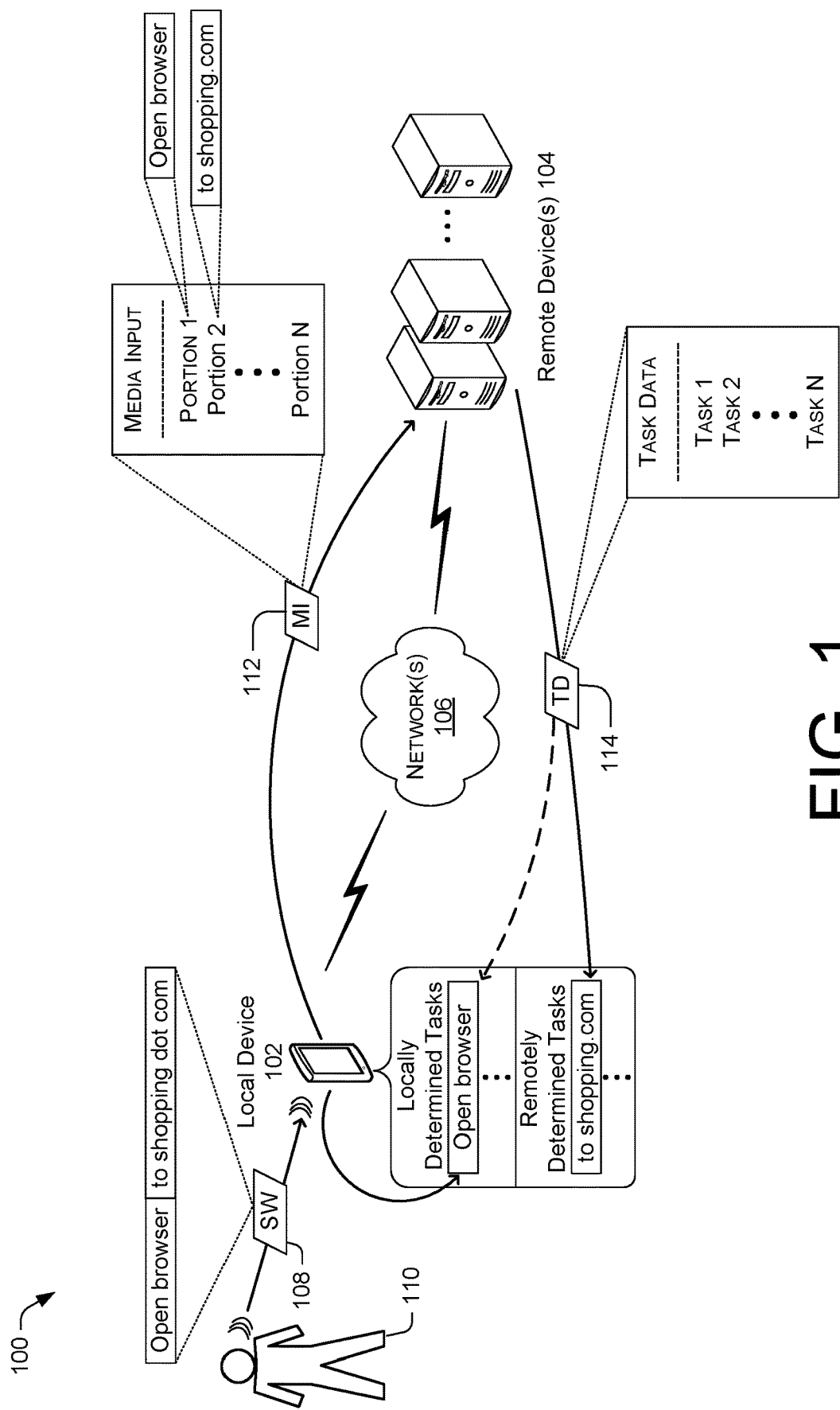
FIG. 1 is a schematic diagram of an illustrative computing environment that facilitates the allocation of local and remote resources for speech processing.

This disclosure is directed to allocating identification and processing of speech at least partly to a local device (e.g., user computing device) and at least partly to a remote device (e.g., remote device, servers, cloud computing resources, etc.) to determine one or more user commands or tasks to be performed. The remote device may be used to process speech that the local device could not process or understand, or for other reasons, such as for error checking. The speech may be captured by the local device as a media input, which may be a file and/or streaming content containing one or more user commands. In some embodiments, the media input containing one or more user commands may be processed to identify speech that can be processed by the local device. The local device may then execute or begin to execute the tasks to reduce user-perceived latency. Meanwhile, the entire media input, or a portion thereof, may be sent to the remote device to process speech, verify the tasks and/or identify other user commands in the media input (or portion thereof).

The spoken words, which are converted to the media input, may include a set of discrete tasks to be performed by the local device and/or at least partly by other devices to fulfill a request received from the user of the local device. The local device may flag the portion of the media input that is processed locally and/or send an indication of the flagged portion to the remote device. The flag may be included as metadata associated with the media input. The remote device may process the remaining portion of the media input, or the entire media input, using automated speech recognition (ASR) and possibly natural language understanding (NLU) to identify tasks present in the speech in the media input. The local device may then receive, from the remote device, words associated with an additional task to be performed locally by the local device. In further embodiments, the local device also receives, from the remote device, all words/tasks identified in the media input, which may enable the local device to perform error checking on locally processed speech. In various embodiments, the remote device may process some tasks, possibly using third party resources, to provide content or information back to the local device along with the task, words, command, etc.

As an example, the local device may capture, via a microphone, spoken words from a user, where the spoken words include "open browser to shopping dot com", which may be converted by the local device to a media input (e.g., a file, a stream of audio, etc.). The local device may perform local ASR on the media input, which may identify some portions of the media input, but not all of the media input. For example, the local ASR may identify a command "open browser" and associate it with computer instructions to open a browser application on the local device. The local device may then take at least some actions to execute the command, such as to open to browser, load data in cache, and/or take other actions that may or may not be perceivable to a user, but may reduce user-perceived latency as compared to processing all speech by the remote device. The local device may send at least the remaining portion of the media input, which may be parsed or sent as a whole, to the remote device.

The remote device may perform ASR and possibly NLU on the media input to determine words, tasks, and/or instructions included in the media input. For example, the remote device may determine that the second portion of the media input relates to a uniform resource locator (URL) of "shopping.com." The remote device may send the words, tasks, and/or instructions included in the media input, or portion thereof, back to the local device for further processing. For example, the local device may then cause the loaded browser to be exposed to the user and to update the URL to "shopping.com", and execute a resource request accordingly.

In some embodiments, the local device may lose connectivity to the remote device. In these instances, the local device may perform local ASR on the media input to identify known tasks. The local ASR may have a limited word vocabulary, and thus may be limited to recognition of a smaller set of words than the remote device. The local device may then deploy other techniques to determine instructions, tasks, and/or words in other portions of the media input that were unsuccessfully processed by the local ASR. For example, the local device may ask a user to manually input information regarding the other portions of the media input, may ask a user to select from options (possible outcomes, etc.), may retry accessing the remote device, may perform NLU locally using a slower and/or less sophisticated algorithms than the NLU deployed by the remote device, and so forth.

In some embodiments, the remote device may send determined words/tasks to the local device and the local device may associate acoustic features of the media input representing the tasks/words with the corresponding tasks/words to train the local device to recognize the speech. For example, when a user continues to use a command over time, the local device may determine that the command is used often, and may "learn" the command by updating the local ASR to understand and recognize the command from spoken words from the user.

The techniques and systems described herein may be implemented in a number of ways. Example implementations are provided below with reference to the following figures.

FIG. 1 is a schematic diagram of an illustrative computing environment 100 that facilitates the allocation of local and remote resources for speech processing. The environment 100 may include a local device 102 and a remote device 104 that is located at a different location from the local device 102. The local device 102 (sometimes referred to as a "user device") may be an electronic device that includes at least some output components (e.g., a display, a speaker, lights, etc.) and at least some input components (e.g., a touchscreen, a microphone, a keyboard, a trackpad, a remote control, etc.). Non-limiting examples of the local device 102 may include a tablet computing device, a microphone array and speaker system, a mobile telephone and/or smartphone, a portable computer, an electronic book reader, a television and/or smart television, a gaming console, a remote control, and/or a set top box or other television control box. The remote device 104 may include servers, cloud computing resources, and/or other devices which may be configured for distributed computing. The advantage of the remote devices 104 is computational power. Thus, the remote devices may be equipped with faster processes and may be capable of performing many more operations per time period than the local device. The remote devices may be optimized for computational demanding tasks, such as NLU. The local device 102 may be in communication with the remote device 104 via one or more networks 106. The networks 106 may include wired networks, wireless networks, or both, which facilitate exchange of at least data between connected devices. In some embodiments, the remote device 104, which may be implemented in a distributed or cloud services configuration, may provide at least some data and/or content to the local device 102.

The local device 102 may receive spoken words 108 ("SW") from a user 110 of the local device 102. The spoken words 108 may be in the form of a verbal request, such as a naturally spoken sentence or a command. In some instances, the spoken words may include a triggering word to initiate action by the local device. In some embodiments, the local device 102 may receive the spoken words 108 via a microphone of the local device 102 and convert received signals into a media input 112 ("MI") representing the spoken words 108. The media input 112 may contain one or more audio portions, which may ultimately be processed by the local device 102, possibly with some help from the remote device 104 and/or other devices (as discussed below). However, as discussed below, the media input 112 may include audio, text, or both depending on various factors such the content of the spoken words 108 and processing abilities of the local device 102, among other possible factors. The spoken words 108 may be a request from the user 110 for the local device 102 to provide user-support by responding to the spoken words 108 and/or by interacting with the user through a conversation dialog to assist the user with a task, answer questions, and/or perform other operations.

In the example provided above, the local device 102 may capture the spoken words 108 from the user 110, where the spoken words include "open browser to shopping dot com", which may be converted by the local device to the media input 112 (e.g., a file, a stream of audio, etc.). The local device 102 may perform local ASR on the media input, which may identify some portions of the media input 112, but not all of the media input. For example, the local ASR may identify a command "open browser" and associate it with computer instructions to open a browser application on the local device 102. The local device 102 may then take at least some actions to execute the command, such as to open to browser, load data in cache, and/or take other actions that may or may not be perceivable to the user 110, but may reduce user-perceived latency as compared to processing all speech by the remote device 104. The local device 102 may send at least the remaining portion of the media input, which may be parsed or sent as a whole, to the remote device 104 as the media input 112. In some embodiments, the local device 102 may perform ASR on all words, but may not perform more advanced and computationally exhaustive analysis of the words, which may be performed by the remote device 104. Thus, the local device 102 may include the text as the media input 112, which may then be sent to the remote device 104 for further analysis, such as for NLU processing of the text to determine an associated task or command.

The remote device 104 may perform ASR and/or NLU on the media input 112 to determine words, tasks, and/or instructions included in the media input 112. For example, the remote device 104 may determine that the second portion of the media input 112 relates to a uniform resource locator (URL) of "shopping.com." The remote device 104 may send the words, tasks, and/or instructions included in the media input, or portion thereof, back to the local device 102 as task data 114 ("TD") for further processing by the local device 102. In this example, the local device 102 may then cause the browser loaded in memory to be exposed to the user and to update the URL to "shopping.com", and execute a resource request accordingly.

As another example, the user 110 may request, via the spoken words 108, "turn on the kitchen lights and adjust the room temperature to seventy two." The local device 102 may receive the spoken words 108 and convert the spoken words 108 into the media input 112 representing the spoken words 108. The local device may parse the media input 112 via local ASR to determine one or more recognizable tasks contained in the media input 112. In the present example, the media input 112 may include a first task to turn on the kitchen lights and a second task to adjust a temperature setting of a thermostat. The local device 102 may locally recognize the first task, but not the second task. After recognizing the first task, the local device 102 may execute the first task and create/execute computer instructions to cause the kitchen light to turn on, and thus provide user-perceivable results with minimal latency. However, the local device may not recognize the second task, and may send the media input 112, or a portion thereof, to the remote device 104 for processing. The remote device 104 may receive the media input 112, or portion thereof, and perform remote ASR and NLU on the media input 112. The remote device 104 may then determine the task data 114, which may include the second task of "adjust the room temperature to seventy two". The remote device 104 may send the task data 114 back to the local device for processing. The local device 104 may then associate task data 114 with computer instructions to perform or execute the second task, such as computer instructions to cause the thermostat to set the room temperature to seventy two degrees. In some embodiments, the task data 114 may include tasks already known by the local device via the local ASR. This may be used for error checking the results of the local device 102 and/or for other reasons such as providing more information for the remote NLU of the media input.

As shown in FIG. 1, the local device 102 may process locally determined tasks while awaiting information about remotely determined tasks, which may be executed by the local device 104 after some latency. The processing of the locally determined tasks may include providing user perceivable results (e.g., turning on the lights, etc.), or may not provide user-perceivable results, but may reduce overall latency such as by loading data in cache or other memory.

Figure 2B:
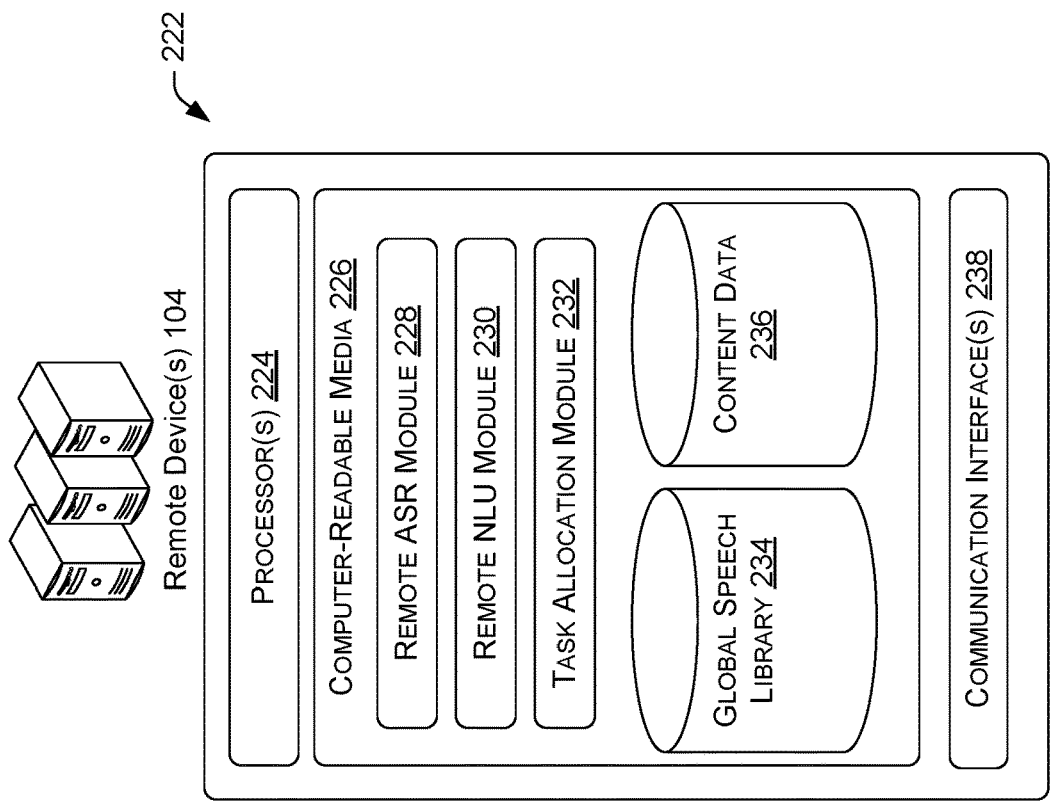
FIG. 2B is a block diagram of illustrative computing architecture of a remote device to facilitate the allocation of local and remote resources for speech processing.
Figure 2A:
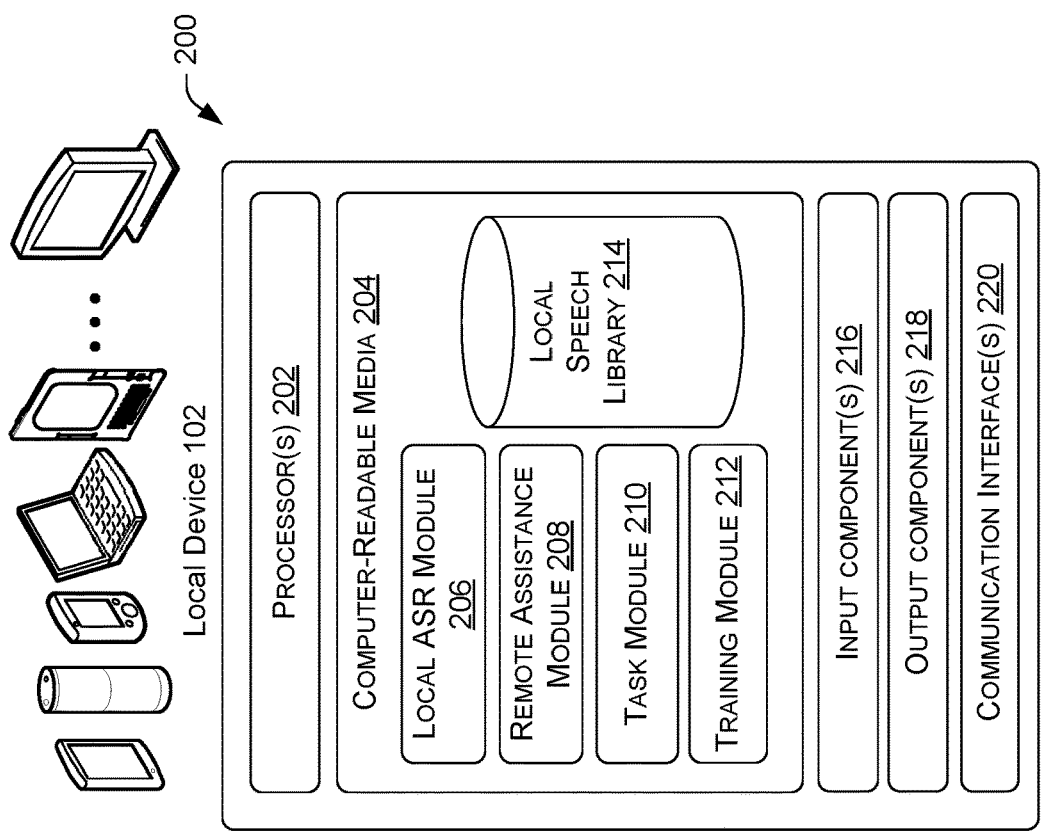
FIG. 2A is a block diagram of illustrative computing architecture of one or more different local devices to facilitate the allocation of local and remote resources for speech processing.

FIG. 2A is a block diagram of illustrative computing architecture 200 of the local device 102 to facilitate the allocation of local and remote resources for speech processing. FIG. 2A is discussed with reference to FIG. 1.

The computing architecture 200 may include one or more processors 202 and one or more computer readable media 204 that store various modules, applications, programs, or other data. The computer-readable media 204 may include instructions that, when executed by the one or more processors 202, cause the processors to perform the operations described herein by the local device 102.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

The computer-readable media 204 may include a local ASR module 206, a remote assistance module 208, a task module 210, and a training module 212, each described below. The computer-readable media 204 may include a local speech library 214 used by the local ASR module 206 and possibly updated by the training module 212. In addition, the computing architecture may include input component(s) 216, output component(s) 218, and communication interface(s) 220, as described below.

The local ASR module 206 may perform speech recognition of the media input 112 using the local speech library 214. The local speech library 214 may include a limited set of recognizable words and/or phrases. The words may relate to commands that are desired to be executed with reduced latency (e.g., turning lights on and off, opening an application, etc.) and with commands that are frequently used by the local device 102. Thus, the local ASR module 206 may have limited ability to convert spoken words into speech and/or have limited ability to determine intent of words/text that are understood from speech-to-text conversion, but may instead identify some known words or commands in the spoken words. The local ASR module 206 may be unable to determine words from some portions of the media input 112 or may be unable to determine a meaning/intent of words/text that are determined, and thus may use the remote assistance module 208 to request the remote device to perform more thorough or complete processing of at least those other portions of the media input 112, and to return results back to the local device for processing by the task module 210. In some embodiments, the local ASR module 206 may perform speech recognition by matching words or phrases with acoustic profiles stored in the local speech library. The words or phrases may be associated with computer executable instructions to perform an operation, such as open a particular application, communicate or provide signals to another device (e.g., cause building lights to turn on/off, etc.), and so forth. In various embodiments, the local ASR module 206 may include a confidence value of a local result. This may be used to update the local speech library 214 and/or update a local result after comparing the local result to a remotely generated result from the remote device. In some embodiments, the local ASR module 206 may perform at least some rudimentary language processing to determine an intent of words/text from the speech-to-text conversion. For example, the local ASR module 206 may include various different phrases of words that map to same computer instructions of a same task, which may enable a user to request the same action using different speech (e.g., "turn the lights on" versus "turn on the lights", which may both be understood by the local ASR module 206).

The local speech library 214 may improve accuracy of the ASR with respect to the user 110. For instance, if the user 110 has an accent with respect to a command, the local device 102 may be trained to accurately respond to the command of the particular user. Additionally or alternatively, the user 110 may employ a dialect, vernacular, or idiom that is particular to a region of the world or even the particular user 110. The local device 102 can be trained to recognize the particular dialect, vernacular, or idiom and thereby improve the accuracy of the ASR and further improve the user 110 experience with the local device 102.

The remote assistance module 208 may interact with the remote device to transmit the media input 112 or a portion thereof to the remote device via the communication interface(s) 220. The remote assistance module 208 may flag or tag portions of the media input that have been processed by the local device 102, and/or may include an associated command in the tag. The tag or flag may be included in metadata associated with the media input 112. The remote assistance module 208 may receive, from the remote device 104, results, which may include words, commands, tasks, and/or information (as a result of tasks processed remotely by the remote device and/or other third party devices).

The task module 210 may perform tasks on the local device based on the results of the local ASR module 206 and/or words and information received from the remote device 104 via the remote assistance module 208. For example, the task module 210 may process first tasks identified by the local ASR module 206 prior receiving results from the remote device 104. In some instances, processing of the first tasks may not be perceivable to the user until after the information from the remote device is received. For example, the processing of the first tasks may include loading data in memory or cache, but not exposing the loaded data to the user. This may reduce latency for processing an entire command by preparing some data in advance while waiting for other data. This may also avoid loading partial data and/or incorrect data to the user, such as when the remote device corrects an error made by the local ASR module 106. In various embodiments, the task module 210 may enable identification of tasks when network connectivity is lost, such as by promoting a user to provide information about parts of the media input that is not understood by the local ASR module 206.

The training module 212 may be used to update the local speech library 214 by adding in relationships of commonly used commands that may be processed with reduced latency by the local device. In some embodiments, the training module 212 may track a returned words from the remote device via the remote assistance module 208. When certain words are used more than a threshold amount within a given period of time, then the training module 212 may update the local speech library to enable the local ASR module 206 to identify the words in speech thereafter. For example, the training module 212 may add the word and acoustic profile to the local speech library 214. In some embodiments, the training module 212 may update the local speech library when processing by the local ASR module 206 actually reduces latency experienced by the user. Thus, some frequently used words may require remote processing, such as request for news data or other data that is often retrieved from remote sources.

As discussed above, the computing architecture 200 may include the input components 216, the output components 218, and the communication interfaces 220. The input components 216 may include a touchscreen, a microphone, a keyboard, a trackpad, a remote control, and/or other devices that convert user actions into input signals that are understandable by a computing device. The output components 218 may include a display, a speaker, lights, haptic feedback, and/or other devices that provide sensory information to a user. The communication interfaces 220 may enable exchange of information with local device 102 and the remote device 104 via the networks 106. The communication interfaces 220 may include radio transceivers, optical communication devices, and/or other types of interfaces that facilitate transmission, receipt, and/or exchange of data.

FIG. 2B is a block diagram of illustrative computing architecture 222 of the remote device 104 to facilitate the allocation of local and remote resources for speech processing. FIG. 2B is discussed with reference to FIG. 1.

The computing architecture 222 may include one or more processors 224 and one or more computer readable media 226 that stores various modules, applications, programs, or other data. The computer-readable media 226 may include instructions that, when executed by the one or more processors 224, cause the processors to perform the operations described herein for the remote device 104.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

The computer-readable media 224 may include a remote ASR module 228, a remote NLU module 230, and a task allocation module 232, each described below. The computer-readable media 204 may include a global speech library 234 used by the global ASR module 228 and content data 236, which may be used to provide information for an identified task. In addition, the computing architecture may include communication interface(s) 238. The communication interface(s) 238 may include radio transceivers, optical communication devices, and/or other types of interfaces that facilitate transmission, receipt, and/or exchange of data.

The remote ASR module 228 may perform speech recognition of the media input 112, or portion thereof, received by the remote device via the communication interface(s) 238. The remote ASR module 228 may use the global speech library to convert acoustic signals into words based on analysis of the media input. The remote ASR module 228 may be similar to the local ASR module 208 in basic function. However the remote ASR module 228 may include a more extensive vocabulary, may include more complex and computationally demanding processing, and may use a generic and more robust analysis that accounts for different accents, dialects, etc. that may be encountered in the media input 112.

The remote NLU module 230 may receive the words determined from the remote ASR module and make corrections based on natural language understanding. The remote NLU module 230 may leverage information in the global speech library. For example, the remote language may receive a media input of "to shopping dot com." The remote ASR module 228 may process that speech to generate the words "two shopping dot com", which may include two incorrect results ("two" instead of "to" and "dot" instead of "."). The remote NLU module 230 may convert "two shopping dot com" to "to shopping.com" based on natural language understanding algorithms, which are computationally demanding and often best performed by a remote device with more processing power and bandwidth than the local device 102.

The task allocation module 232 may allocate tasks resulting from the remote ASR module 228 and/or remote NLU module 230. For example, when the results are words that indicate a task that can be executed by the remote device 104 prior to returning information to the local device 104, the task allocation module 232 may allocate those tasks to resources and/or process the tasks directly to generate information which can then be transmitted to the local device 102 along with the converted words. For example, if the media input is "what is the time in Berlin", the task allocation module 232 may determine the current time in Berlin, Germany, and send that information to the local device along with the text words, and thus may provide a result of <"what is the current time in Berlin?", 3:41 pm>, for example. In some embodiments, the task allocation module 232 may obtain results for requests from the content data 236.

FIGS. 3-8 show illustrative processes. The processes are illustrated as a collection of blocks in a logical flow graph, which represent a sequence of operations that can be implemented in hardware, software, or a combination thereof. In some processes, the collection of blocks is organized under respective entities that may perform the various operations described in the blocks. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
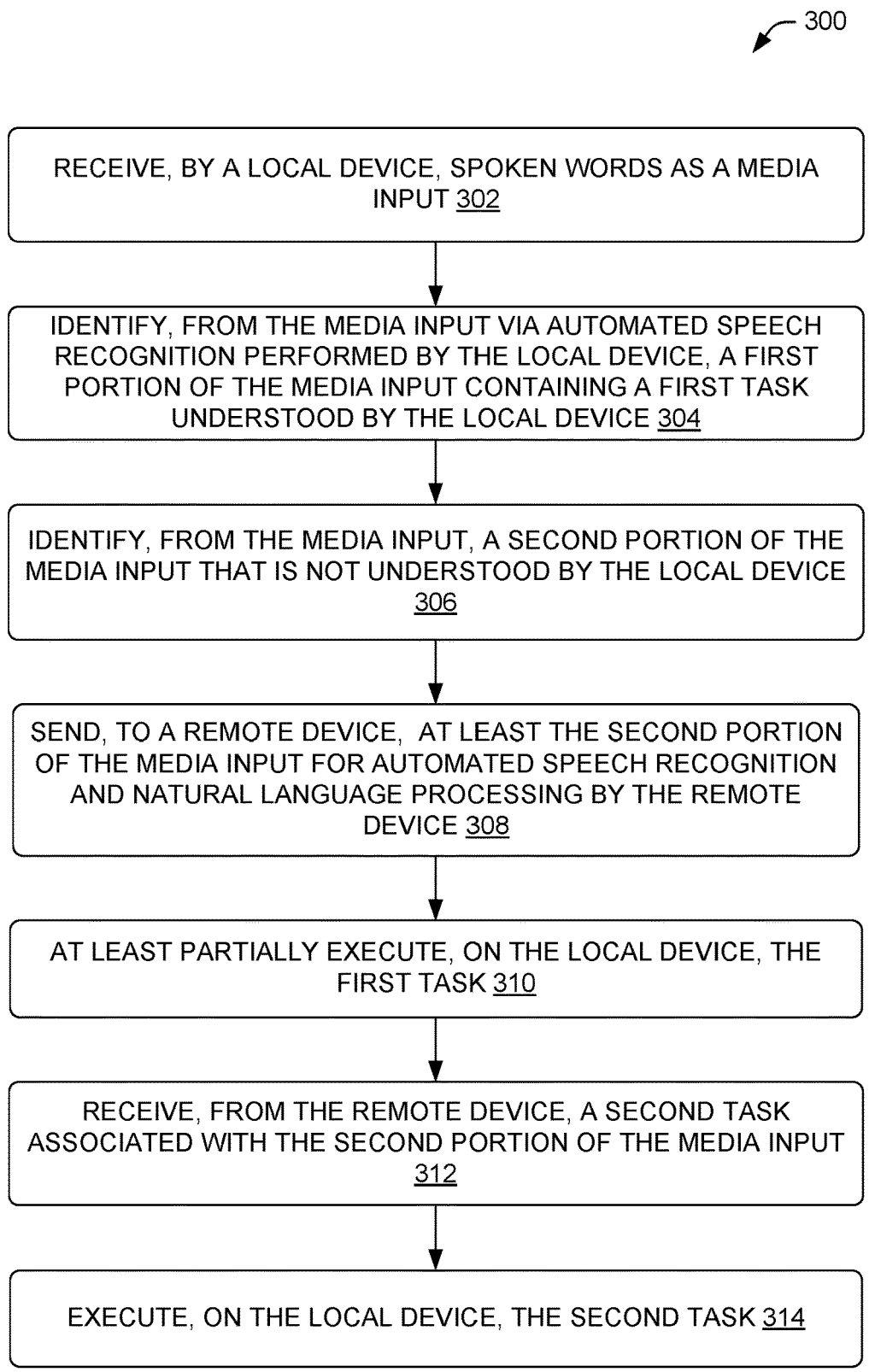
FIG. 3 is a flow diagram of an illustrative process of identifying a command from a media input and processing the command locally while sending at least some of the media input to a remote device for further speech processing.

FIG. 3 is a flow diagram of an illustrative process of identifying a command from the media input 112 and processing the command locally while sending at least some of the media input 112 to the remote device 104 for further speech processing. The process 300 is described with reference to the environment 100 and the computing architectures 200 and 222. However, the process 300 may be performed in other similar and/or different environments. The process 300 shows high level interactions between the local device 102 and the remote device 104.

At 302, the local device 102 may receive a signal representing the spoken words 108 that are spoken by the user 110. The spoken words may be uttered by a user within a proximity of the local device 102 and captured by a microphone or other input device of the local device 102. The microphone may convert the sound to an analog electrical signal which may be converted into a digital signal via an analog-to-digital converter. The digital signal may be processed (and possibly stored) as the media input 112 (e.g., a compressed or uncompressed audio file format).

At 304, the local ASR module 206 may analyze the media input 112 to locally identify words, and thus commands or tasks to complete. The local ASR module 206 may identify a first portion of the media input 112 containing a first task understood by the local device 102.

At 306, the local ASR module 206 may identify a second portion of the media input 112 that is not understood by the local device, and thus may be sent to the remote device 104 for further processing. For example the local ASR module 206, after analysis of the second portion, may not include matched results and/or results having confidence level higher than a threshold level. As another example, the local ASR module 206 may understand words in the second portion, but not understand a meaning. The words determined by the local ASR module 206 may be included in the media input 112 with or without audio information.

At 308, the remote assistance module 208 may send to the remote device 104 at least the second portion of the media input 112 to cause the remote ASR module 228 and/or the remote NLU module 230 to process at least this portion of the media input 112. In some embodiments, the remote assistance module 208 may send the entire media input 112, even when a portion of the media input is understood by the local ASR module 206. This may accommodate error checking and/or may be used for other purposes, such as NLU of the text.

At 310, the task module 210 may at least partially execute the first task on the local device 102. In some instances, the results of the local execution may be quickly perceivable, such as when the command is to turn on lights, etc. However, sometimes the locally executed tasks may not be perceivable by the user for various reasons, such as being incomplete without more information or possibly inaccurate. For example, the task module 210 may cause an application to be loaded to memory, but not yet revealed to the user until data is received from the remote device that confirms the command and/or provides addition data about the command. In various embodiments, performance of the first task may include executing or calling a local device driver that causes an operation to be executed, such as calling a local device driver associated with remotely operated lights or other home automation devices, and causing the local device driver to transmit a signal to the lights to cause the lights to turn on or off. The local device driver may be executed on the local device 102, which may send the signal from the local device 102 to another device (e.g., the lights) for processing (e.g., to turn the lights on/off in response to the signal). The local device driver may process parameters from speech to create the signal for the home automation device. Other local device drivers may operate a wide variety of devices and/or home automation devices including, without limitation, door locks, surveillance cameras, music players, garage doors, thermostats, watering systems, food preparation and storage devices, laundry or other cleaning machines, and so forth.

At 312, the remote assistance module 208 may receive a second task associated with the second portion. The second task may be words resulting from the remote ASR module 228 and the remote NLU module. At 312, the remote assistance module 208 may also receive other words/tasks of other portions of the media input 112 if other portions were sent to the remote device 104. The duplication may be used for error checking and/or other purposes. In some embodiments, at 312, the remote assistance module 208 may receive a response from the remote device that confirms processing by the remote device. For example, the remote device may process the media input 112 to determine a command to execute, possibly by other devices such as a third party device.

At 314, the task module 210 may execute the second command on the local device. In some embodiments the second command task may be associated with or part of the first task, and thus the execution may be performed at least partially together. For example, the first task may be executed at 310 to load data in memory, and the second task executed at 314 may modify that data and then make the result visible to the user. In other instances, the first task and the second task may be independent from one another, and may be performed at separate times.

Figure 4:
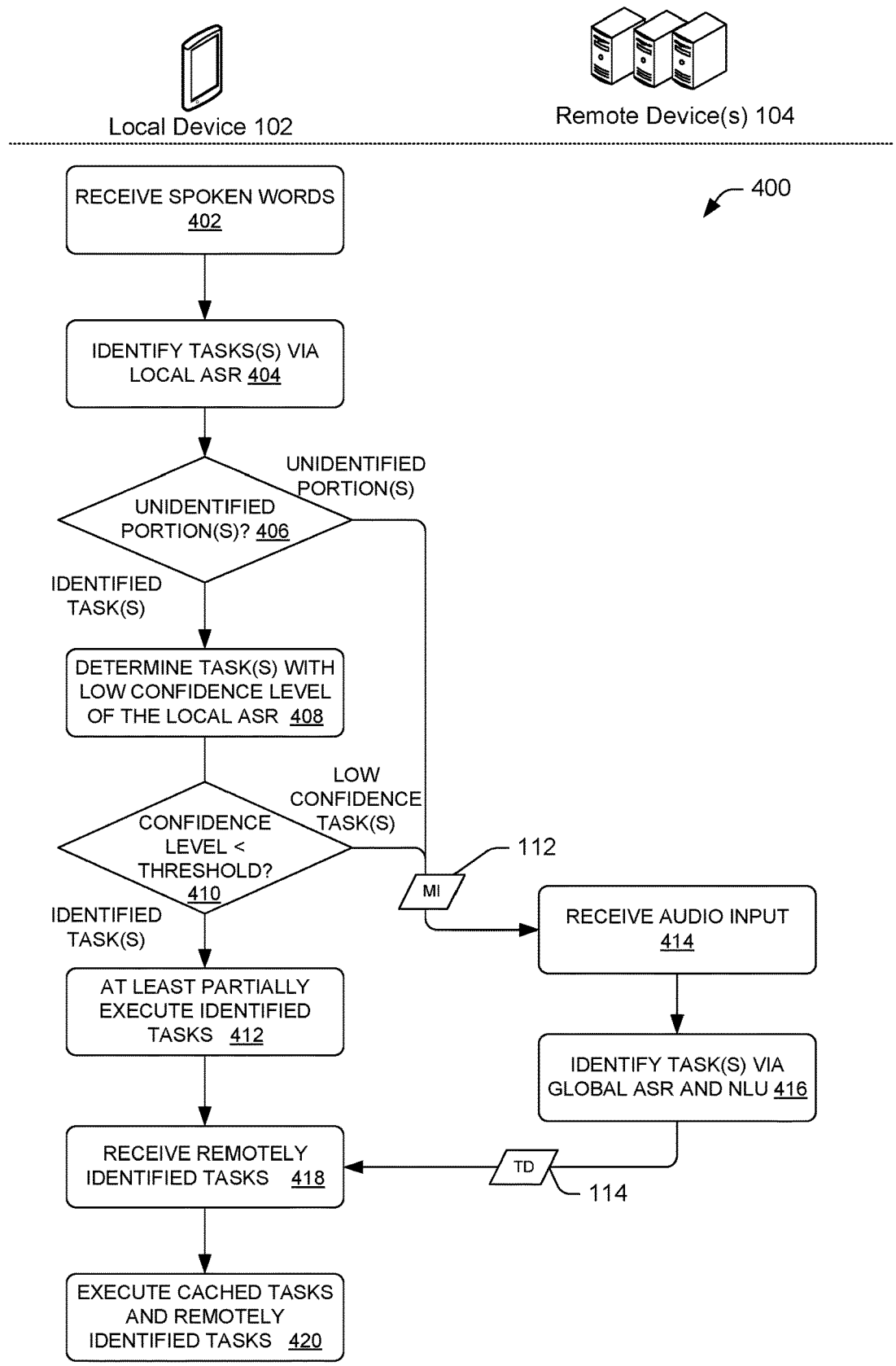
FIG. 4 is a flow diagram of an illustrative process of distributing, to a remote device, speech that cannot be identified by a local device and/or speech identified by the local device with a low confidence level.

FIG. 4 is a flow diagram of another illustrative process 400 of distributing, to a remote device 104, speech that cannot be identified by a local device 102 and/or speech identified by the local device with a low confidence level. The process 400 is described with reference to the environment 100 and the computing architectures 200 and 222. However, the process 400 may be performed in other similar and/or different environments.

At 402, the local device 102 may receive a signal representing the spoken words 108 that are spoken by the user 110, which may be used to create the media input 112 as discussed in the operation 302 above.

At 404, the local ASR module 206 may identify words, and thus tasks, in at least a portion of the media input 112. The local ASR module 206 may include a confidence level with at least some words, which may represent a likelihood that the result is a correct result.

At 406, the remote assistance module 208 may determine whether unidentified portions of the media input 112 are present, which are portions of the media input that the local ASR module 206 is unable to convert from speech to text. These unidentified portions may be transmitted to the remote device 104 for further processing. In some embodiments, the remote assistance module 208 may flag portions of the media input 112 as unidentified and/or other portions as identified. The identified portions may be tagged with the identified text.

At 408, the remote assistance module 208 may identify tasks (or words) having a low confidence level, but understood by the local ASR module 206. As discussed above, the local ASR module 206 may include confidence levels with at least some of the speech to text conversions.

At 410, the remote assistance module 208 may determine words/tasks with a low confidence (e.g., a confidence level less than a threshold level). The remote assistance module 208 may then direct the remote device to analyze corresponding portions of the media input 112 to at least verify a correctness of processing by the local ASR module 206. Thus, at the decision operations 406 and 410, the remote assistance module 208 may cause at least portions of the media input 112 to be transmitted to the remote device.

At 412, the task module 210 may at least partially execute the identified tasks. In some instances, the results of the local execution may be quickly perceivable, such as when the command is to turn on lights, etc. However, some times the locally executed tasks may not be perceivable by the user for various reasons, such as being incomplete without more information or possibly inaccurate. For example, the task module 210 may cause an application to be loaded to memory, but not yet revealed to the user until data is received from the remote device that confirms the command and/or provide addition data about the command.

Meanwhile, at 414, the remote device 104 may receive the media input 112, or portion(s) of the media input from the local device 102.

At 416, the remote ASR module 228 and the remote NLU module 230 may process the media input 112 or portions of the media input 112 to determine resulting words or tasks. The ASR and NLU processing may be performed as discussed above with reference to the computing architecture 222. The remote device 104 may then transmit those words or tasks, possibly as the task data 114, to the local device for processing.

At 418, the remote assistance module 208 may receive the remotely identified tasks or words. The remote assistance module 208 may also receive other words/tasks of other portions of the media input 112 if other portions were sent to the remote device 104. The duplication may be used error checking and/or other purposes.

At 420, the task module 210 may execute the remotely identified tasks and/or execute cached tasks (or other partially performed tasks from locally identified tasks). By performing the processing locally, the end-to-end process latency may be reduced by the operation 412 occurring in parallel with the operation 414 and/or the operation 416.

Figure 5:
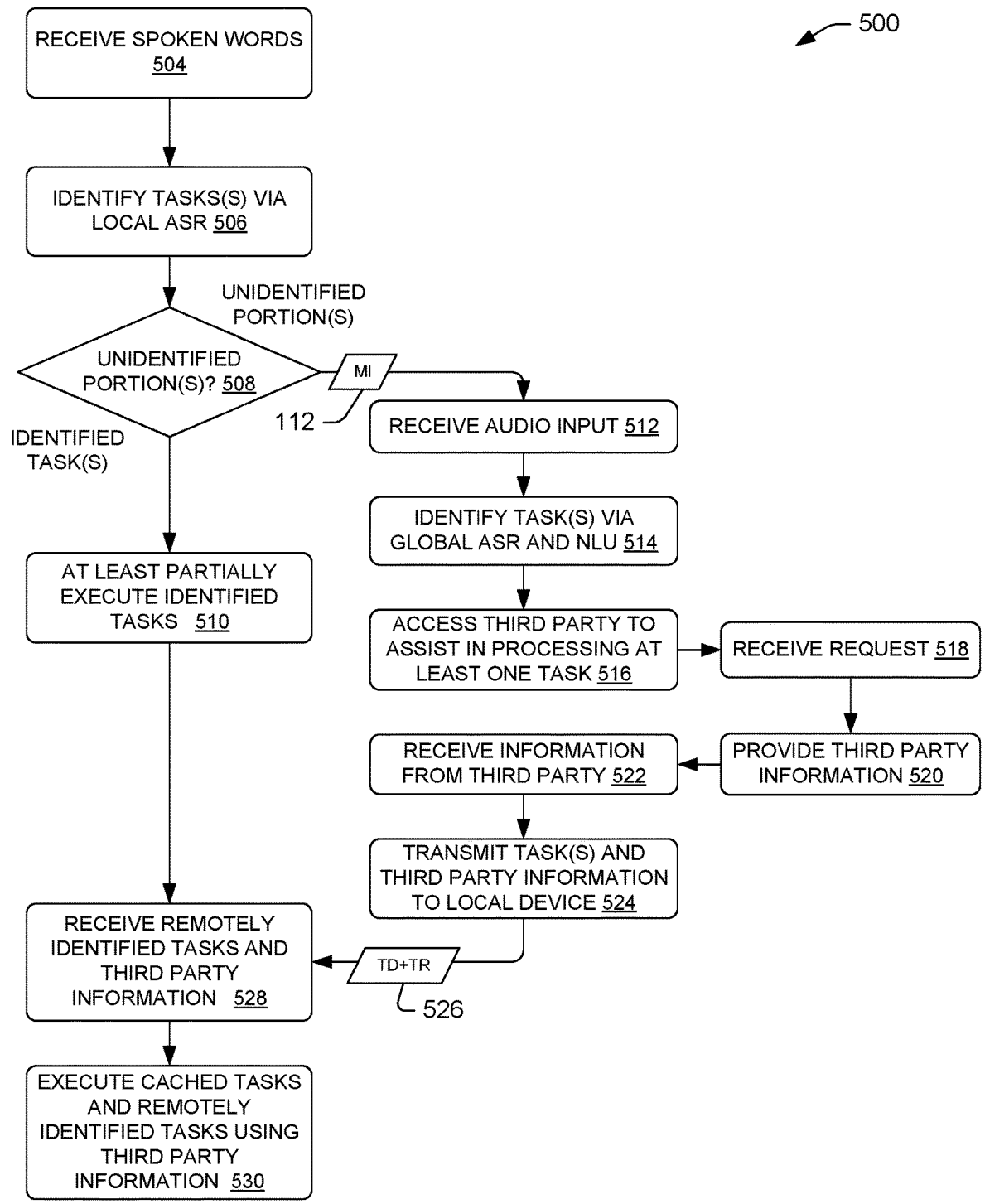
FIG. 5 is a flow diagram of an illustrative process of performing at least some tasks associated with a speech input by a remote device and/or a third party device prior to returning results back to the local device.

FIG. 5 is a flow diagram of an illustrative process 500 of performing at least some tasks associated with a speech input by a remote device and/or third party device(s) 502 prior to returning results back to the local device. The third party devices(s) 502 may be any other remote computing device that is a source of information and in communication with the remote device 104 via the network(s) 106. The process 500 is described with reference to the environment 100 and the computing architectures 200 and 222. However, the process 500 may be performed in other similar and/or different environments.

At 504, the local device 102 may receive a signal representing the spoken words 108 that are spoken by the user 110, which may be used to create the media input 112 as discussed in the operation 302 above.

At 506, the local ASR module 206 may identify words, and thus tasks, in at least a portion of the media input 112. The local ASR module 206 may include a confidence level with at least some words, which may represent a likelihood that the result is a correct result.

At 508, the remote assistance module 208 may determine whether unidentified portions of the media input 112 are present, which are portions of the media input that the local ASR module 206 is unable to convert from speech to text. These unidentified portions may be transmitted to the remote device 104 for further processing. In some embodiments, the remote assistance module 208 may flag portions of the media input 112 as unidentified and/or other portions as identified. The identified portions may be tagged with the identified text.

At 510, the task module 210 may at least partially execute the identified tasks. In some instances, the results of the local execution may be quickly perceivable, such as when the command is to turn on lights, etc. However, some times the locally executed tasks may not be perceivable by the user for various reasons, such as being incomplete without more information or possibly inaccurate. For example, the task module 210 may cause an application to be loaded to memory, but not yet revealed to the user until data is received from the remote device that confirms the command and/or provides addition data about the command.

Meanwhile, at 512, the remote device 104 may receive the media input 112, or portion(s) of the media input from the local device 102.

At 514, the remote ASR module 228 and the remote NLU module 230 may process the media input 112 or portions of the media input 112 to determine resulting words or tasks.

The ASR and NLU processing may be performed as discussed above with reference to the computing architecture 222.

At 516, the task allocation module 232 may recognize a task from the processing at the operation 514 that uses or relies on third party data to be fulfilled. The task allocation module 232 may transmit a request to the third party device(s) for the requested data.

At 518, the third party device(s) may receive the media input request from the remote device 104. For example, the request may be for specific content available from the third party, such as digital media, information, services, and so forth.

At 520, the third party device(s) 502 may obtain and then provide the requested information to the remote device 104. In some embodiments, the third party device(s) may provide the requested information directly to the local device 102, such as when the remote device 104 provides routing information for the local device. This may be helpful with the requested information is streamed information, such as streaming music or video.

At 522, the remote device 104 may receive the requested information from the third party device(s) 502 from the operation 520.

At 524, the remote device 104 may transmit the requested information as the task data and third party information 526 to the local device. The information may be transmitted together or separately.

At 528, the remote assistance module 208 may receive the remotely identified tasks or words and the third party information. The remote assistance module 208 may also receive other words/tasks of other portions of the media input 112 if other portions were sent to the remote device 104. The duplication may be used error checking and/or other purposes.

At 530, the task module 210 may execute the remotely identified tasks using the third party information and/or execute cached tasks (or other partially performed tasks from locally identified tasks). By performing the processing locally, the end-to-end process latency may be reduced by the operations 512-524 occurring in parallel with the operation 510. By requesting the information from the third party device(s) 502 by the remote device 104, additional transmissions of data and/or request may be avoided, and thus may reduce latency in performing the operation 530.

Figure 6:
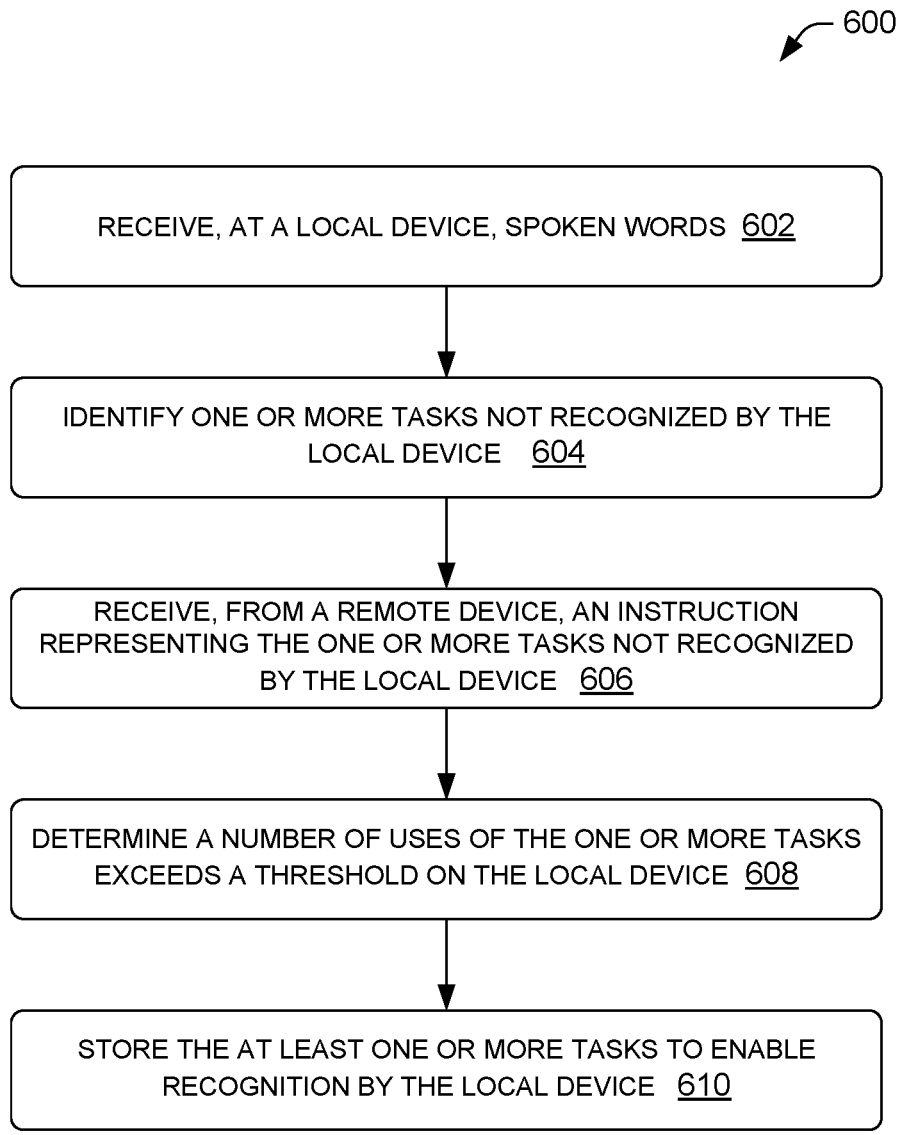
FIG. 6 is a flow diagram of an illustrative process of training a task to be recognized locally by a local device based on repetitive use of the task.

FIG. 6 is a flow diagram of an illustrative process 600 of training a task to be recognized locally by a local device based on repetitive use of the task. The process 600 is described with reference to the environment 100 and the computing architectures 200 and 222. However, the process 600 may be performed in other similar and/or different environments.

At 602, the local device 102 may receive the spoken words 110. The words may be converted to an audible command signal representing one or more tasks to be executed by the local device 102.

At 604, the local device 102 may compare at least a portion of the media input to one or more stored signal acoustic profiles stored locally on the local device 102 in the local speech library 214. The comparison may identify a portion of the media input that is not recognized via the comparison. The local device 102 may transmit or send the at least the portion of the media input to the remote device 104 for additional processing using ASR and NLP techniques by the remote device 104.

At 606, the local device 102 may receive, from a remote device 104, words or tasks associated with remote processing of the at least the portion of the media input that was identified by the local device 102 as not recognized. The task data may be in the form of speech-to-text data representing the media input processed by the remote device 104, one or more instructions executable by the local device 102.

At 608, training module 212 of the local device 102 may determine that a number of uses of the one or more tasks exceeds a threshold value. For instance after a threshold number of occurrences of the returned words within a predetermined time frame, the training module 212 may determine to update the local speech library 214 so that the local ASR module 208 can understand the words and preform a speech-to-text conversion without reliance on the remote device in subsequent uses of the speech. In some embodiments, the training module 212 may only update the local speech library 214 when the words relate to instructions that reduce user-perceived latency, and thus can be at least partially executed by the local device 102 without reliance on data from the remote device 104.

At 610, the training module 212 may receive the task or words associated with the request and store information associated with the task/words and/or the portion of the media input representing the request in the local speech library 214 and/or train the local ASR module 206 to recognize the media input in subsequent occurrences.

Figure 7:
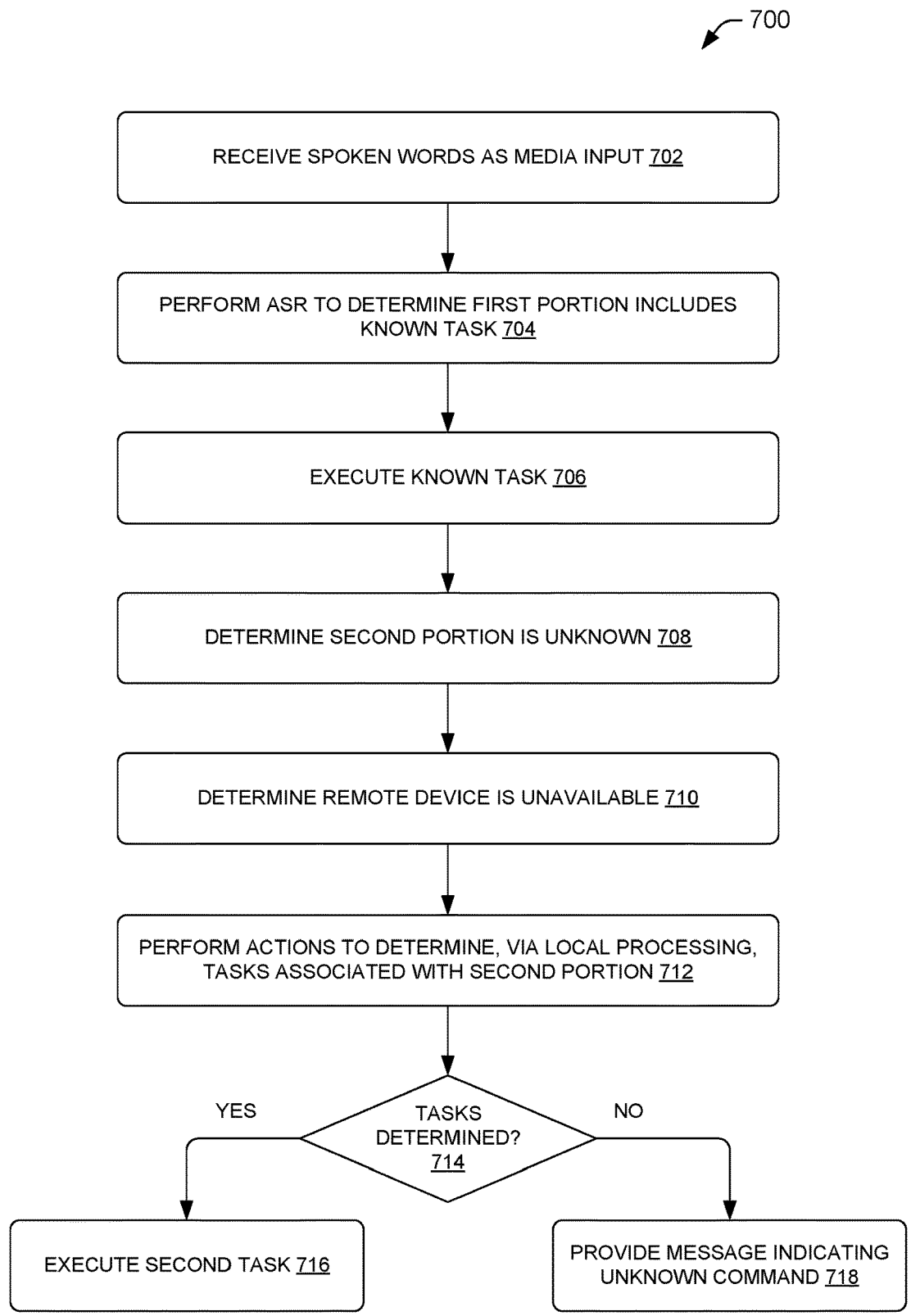
FIG. 7 is a flow diagram of an illustrative process of processing speech locally when connectivity to a remote device is unavailable.

FIG. 7 is a flow diagram of an illustrative process 700 of processing speech locally when connectivity to a remote device is unavailable. The process 700 is described with reference to the environment 100 and the computing architectures 200 and 222. However, the process 700 may be performed in other similar and/or different environments.

At 702, the local device 102 may receive a signal representing the spoken words 108 that are spoken by the user 110, which may be used to create the media input 112 as discussed in the operation 302 above.

At 704, the local ASR module 206 may perform ASR to determine a first portion of the media input 112 includes known words/tasks. The local ASR module 206 may include a confidence level with at least some words, which may represent a likelihood that the result is a correct result.

At 706, the task module 210 may at least partially execute the known task locally. The executing may include loading data to memory and other tasks that may not be perceivable to the user. In some instances, the tasks and results of performance of the tasks may be perceivable, such as turning on lights in a room.

At 708, the local ASR module 206 may determine that a second portion of the media input is unknown and not understood by the local ASR module 206. For example, second portion may not match acoustic profiles stored in the local speech library 214 and/or may have a low confidence level that is below a threshold.

At 710, the remote assistance module 208 may determine that the remote device is not available to assist with determining the second portion of the media input. For example, the remote assistance module 208 may determine that the local device does not have connectivity to the remote device 104 and/or determine that the remote device 104 is unavailable for other reasons.

At 712, the task module 210 may perform actions to determine tasks associated with the second portion of the media input using one or more techniques. In some embodiments, the task module 210 may use results of the local ASR module 206 even when the results included a confidence level lower than the threshold. In various embodiments, the task module 210 may output a request for additional user input to explain the portion of the media input, such as by requesting the user to input text related to the second portion and/or use other words to explain the task. For example, the user may manually input text related to the second portion, which may allow the task module 210 to complete the task. Meanwhile the remote assistance module 208 may continue to seek connectivity with the remote device 104 to enable processing as discussed in the process 400.

At 714, the task module 210 may determine whether additional words or tasks are determined based on the operation 712. When additional tasks are determined using one or more of the techniques provided above, the processing may advance to an operation 716.

At 716, following the "yes" route from the decision operation 714, the task module 210 may execute tasks associated with the second portion of the media input.

At 718, following the "no" route from the decision operation 714, the task module 210 may provide a message indicating a presence of an unknown command or portion of the input by the spoken words 110.

Figure 8:
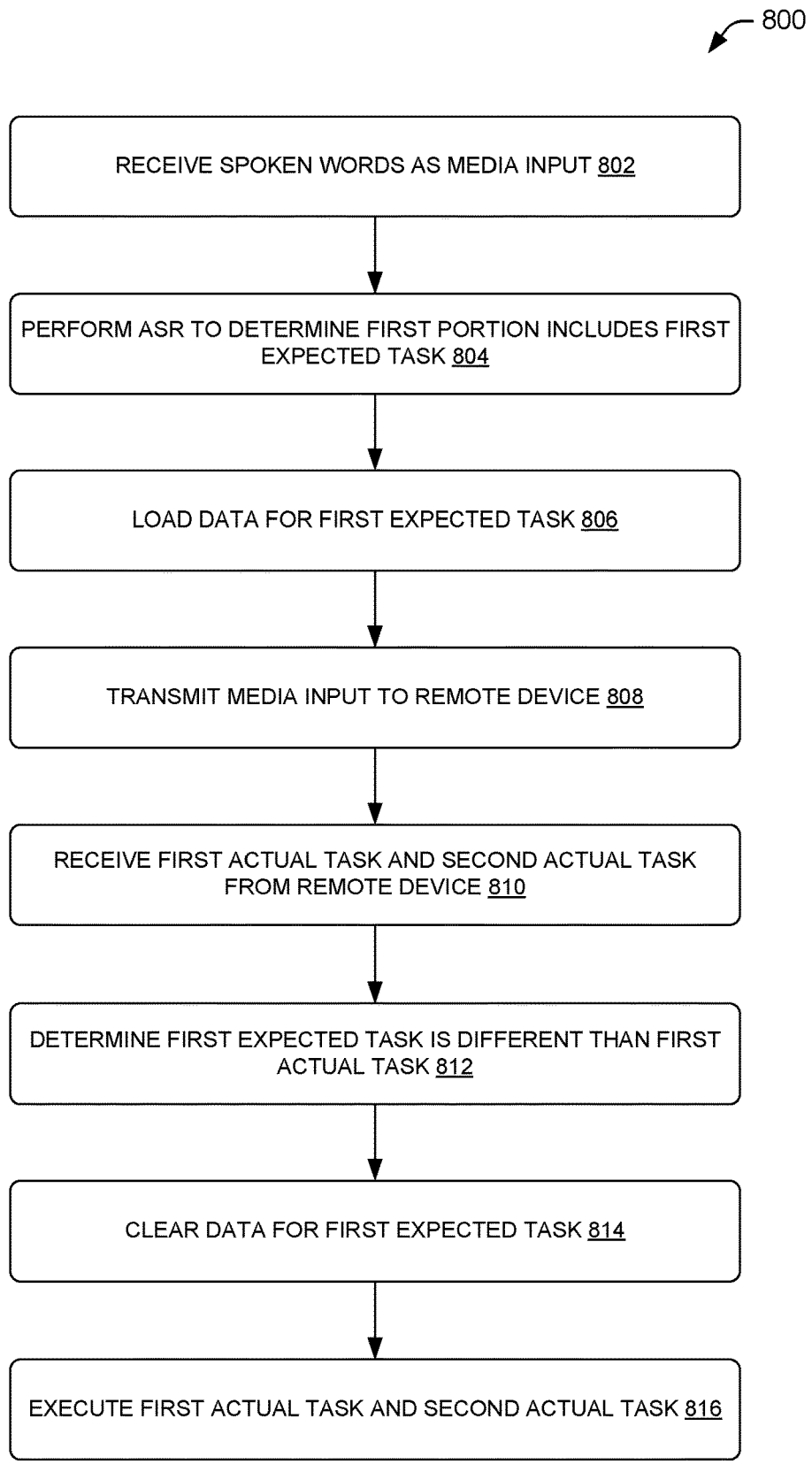
FIG. 8 is a flow diagram of an illustrative process of updating results of locally processed speech using remotely processed speech.

FIG. 8 is a flow diagram of an illustrative process 800 of updating results of locally processed speech using remotely processed speech. The process 800 is described with reference to the environment 100 and the computing architectures 200 and 222. However, the process 800 may be performed in other similar and/or different environments.

At 802, the local device 102 may receive a signal representing the spoken words 108 that are spoken by the user 110, which may be used to create the media input 112 as discussed in the operation 302 above.

At 804, the local ASR module 206 may perform ASR to determine a first portion of the media input 112 includes known words/tasks. The local ASR module 206 may include a confidence level with at least some words, which may represent a likelihood that the result is a correct result.

At 806, the task module 210 may load data for the expected task. The executing may include loading data to memory and other tasks that may not be perceivable to the user without further actions, such as causing a display of resulting information.

At 808, the remote assistance module 208 may transmit the media input 112 to the remote device 104 for processing. In some embodiments, the remote assistance module 208 may flag or tag portions of the media input that are recognized by the local device and/or portions that are not recognized by the local device. This information may be later used to determine conflicts in results for error checking and/or identify which portions are to be prioritized for speech-to-text conversion by the remote device 104.

At 810, the remote assistance module 208 may receive a first actual task and a second actual task from the remote device, where the first actual task is different than the first expected task determined at the operation 804.

At 812, the task module 210 may determine that the first actual task received from the remote device 104 is different than the first expected task determined at the operation 804. The task module 210 may deter to the results from the remote device 104 as being more likely to be correct, and then perform operations accordingly.

At 814, the task module 210 may clear data (or otherwise ignore or not use the data) loaded at the operation 806. For example, if data was loaded in cache at 806, the mask module 210 may overwrite that cache with data for the first actual task determined by the remote device 104.

At 816, the task module 210 may execute the first actual task and second actual task to provide results to the user. Although the process 800 may not reduce latency, the results may be more accurate, and thus provide a benefit to the user.

Such an error checking process may be included in the other processes discussed above, which may reduce providing wrong or unexpected results by processing by the local ASR module 206, while still having the user experience reduced latency in many of the operations performed by the technique discussed here.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A first device comprising:
   one or more processors; and
   one or more non-transitory computer-readable media storing computer-executable instructions that, when executed by the one or more processors, cause the one or more processors to perform acts comprising:
   receiving, from a second device, audio data corresponding to a user utterance, wherein a portion of the audio data is unrecognized by speech processing on the second device;
   performing language understanding processing on the portion of the audio data;
   determining a task associated with the portion of the audio data;
   transmitting, to a third device, a request for content associated with a performance of the task;
   receiving, from the third device, first data representing the content; and
   transmitting, to the second device, second data representing the content, wherein the second device is configured to utilize the content during the performance of the task.

2. The first device of claim 1, the acts further comprising:
   determining words associated with the portion of the audio data; and
   transmitting, to the second device, third data representing the words, wherein the second device is configured to store the words in memory of the second device.

3. The first device of claim 2, wherein the portion of the audio data comprises a first portion of the audio data and the task comprises a first task, the acts further comprising:
   determining, within the audio data, a second portion of the audio data, wherein the second portion of the audio data is recognized by the speech processing on the second device;
   receiving, from the second device, an indication of a second task to be performed by the second device, the second task associated with the second portion of the audio data;
   performing language understanding processing on the second portion of the audio data;
   determining a third task associated with the second portion of the audio data;
   determining that the third task is different than the second task; and
   transmitting, to the second device, third data representing the third task, wherein the second device is configured to perform the third task.

4. The first device of claim 3, the acts further comprising:
receiving, from the second device, additional data representing first words of the second portion of the audio data as determined by the speech processing of the second device;
determining second words of the second portion of the audio data based at least in part on performing the language understanding processing; and
comparing the second words and the first words,
wherein determining that the third task is different than the second task is based at least in part on comparing the second words and the first words.

5. The first device of claim 1, the acts further comprising:
determining an additional task associated with the audio data; and
at least one of:
 transmitting third data representing the additional task to the second device, wherein the second device is configured to transmit a request to the third device or a fourth device to perform the additional task; or
 transmitting, to the third device or the fourth device, the third data representing the additional task, wherein the third device or the fourth device is configured to:
  perform the additional task; or
  transmit fourth data to the second device.

6. The first device of claim 1, the acts further comprising receiving, from the second device, metadata associated with the portion of the audio data, the metadata designating the portion of the audio data unrecognized by the speech processing of the second device.

7. A method comprising:
receiving, at a first device, first audio data representing a first user utterance;
determining that the first audio data is recognized by one or more speech processing components of the first device;
receiving, at the first device, second audio data representing a second user utterance;
determining that a portion of the second audio data is unrecognized by the one or more speech processing components of the first device;
sending the second audio data to a second device;
performing, at the second device, speech language processing on the second audio data;
determining, at the second device, a task associated with the second audio data; and
transmitting, from the second device to the first device, data representing the task, wherein the first device is configured to perform the task.

8. The method of claim 7, wherein the task comprises a first task, further comprising:
sending the first audio data to the second device;
receiving, at the second device from the first device, an indication of a second task to be performed by the first device, the second task associated with the first audio data;
determining, at the second device, a third task associated with the first audio data;
determining that the third task is different than the second task; and
transmitting, from the second device to the first device, additional data representing the third task, wherein the first device is configured to perform the third task.

9. The method of claim 8, wherein at least one of:
the first device is configured to perform at least a first portion of the third task and at least a second portion of the first task during a first time period; or
the first device is configured to perform at least a third portion of the first task and at least the second portion of the second task during a second time period.

10. The method of claim 7, wherein the task comprises a first task, further comprising:
sending the first audio data to the second device;
receiving, at the second device from the first device, an indication of a second task to be performed by the first device, the second task associated with the first audio data;
determining, at the second device, a third task associated with the first audio data;
determining that the third task is a same as the second task; and
one of:
 transmitting, from the second device to the first device, a confirmation of the second task, or
 refraining from transmitting the confirmation to the first device.

11. The method of claim 7, further comprising receiving, from the first device, metadata associated with the portion of the second audio data, the metadata including text determined by the one or more speech processing components of the first device.

12. The method of claim 7, further comprising:
determining an additional task associated with the first audio data or the second audio data; and
at least one of:
 transmitting additional data representing the additional task to the first device, wherein the first device is configured to transmit a request to a third device to perform the additional task; or
 transmitting, to the third device, the additional data representing the additional task, wherein the third device is configured to perform the additional task.

13. The method of claim 7, further comprising:
determining that at least one of:
 the task is unrecognized by the first device a threshold number of times; or
 words associated with the portion of the second audio data are unrecognized by the first device the threshold number of times; and
transmitting additional data to the first device, the additional data representing the words, wherein the first device is configured to store the words in a speech library associated with the first device.

14. A method comprising:
receiving, at a first device from a second device, audio data corresponding to a user utterance, wherein a portion of the audio data is unrecognized by speech processing on the second device;
performing, at the first device, language understanding processing on the portion of the audio data;
determining, at the first device, a task associated with the portion of the audio data;
transmitting, from the first device to a third device, a request for content associated with a performance of the task;
receiving, at the first device from the third device, first data representing the content; and
transmitting, from the first device to the second device, second data representing the content, wherein the second device is configured to utilize the content during the performance of the task.

15. The method of claim 14, further comprising:
determining, at the first device, words associated with the portion of the audio data; and transmitting, from the first device to the second device, third data representing the words, wherein the second device is configured to store the words in memory of the second device.

16. The method of claim 15, wherein the task is associated with a command, further comprising determining, at the first device, that a frequency of occurrence of the command meets or exceeds a threshold, and wherein transmitting the third data is based at least in part on determining that the frequency of occurrence of the command meets or exceeds the threshold.

17. The method of claim 15, wherein the portion of the audio data comprises a first portion of the audio data and the task comprises a first task, further comprising:
   determining, at the first device, a second portion of the audio data, wherein the second portion of the audio data is recognized by the speech processing on the second device;
   receiving, at the first device from the second device, an indication of a second task to be performed by the second device, the second task associated with the second portion of the audio data;
   performing, at the first device, language understanding processing on the second portion of the audio data;
   determining, at the first device, a third task associated with the second portion of the audio data;
   determining, at the first device, that the third task is different than the second task; and
   transmitting, from the first device to the second device, third data representing the third task, wherein the second device is configured to perform the third task.

18. The method of claim 17, further comprising:
   receiving, at the first device from the second device, additional data representing first words of the second portion of the audio data as determined by the speech processing of the second device;
   determining, at the first device, second words of the second portion of the audio data based at least in part on performing the language understanding processing; and
   comparing, at the first device, the second words and the first words,
   wherein determining that the third task is different than the second task is based at least in part on comparing the second words and the first words.

19. The method of claim 14, further comprising:
   determining, at the first device, an additional task associated with the audio data; and
   at least one of:
      transmitting, from the first device, third data representing the additional task to the second device, wherein the second device is configured to transmit a request to the third device or a fourth device to perform the additional task; or
      transmitting, from the first device to the third device or the fourth device, the third data representing the additional task, wherein the third device or the fourth device is configured to:
         perform the additional task; or
         transmit fourth data to the second device.

20. The method of claim 14, further comprising receiving, at the first device from the second device, metadata associated with the portion of the audio data, the metadata designating the portion of the audio data unrecognized by the speech processing of the second device.

* * * * *